US009851254B2

(12) United States Patent
Dumont et al.

(10) Patent No.: US 9,851,254 B2
(45) Date of Patent: Dec. 26, 2017

(54) DEVICE FOR DETECTING ELECTROMAGNETIC RADIATION POSSESSING A HERMETIC ENCAPSULATING STRUCTURE COMPRISING AN EXHAUST VENT

(71) Applicant: Commissariat A L'Energie Atomique et aux Energies Alternatives, Paris (FR)

(72) Inventors: Geoffroy Dumont, Paris (FR); Laurent Carle, Grenoble (FR); Pierre Imperinetti, Seyssins (FR); Stephane Pocas, Grenoble (FR); Jean-Jacques Yon, Sassenage (FR)

(73) Assignee: Commissariat A L'Energie Atomique et aux Energies Alternatives, Paris (FR)

( * ) Notice: Subject to any disclaimer, the term of this patent is extended or adjusted under 35 U.S.C. 154(b) by 110 days.

(21) Appl. No.: 15/048,058

(22) Filed: Feb. 19, 2016

(65) Prior Publication Data
US 2016/0245702 A1    Aug. 25, 2016

(30) Foreign Application Priority Data

Feb. 20, 2015  (FR) ...................... 15 51489

(51) Int. Cl.
*G01J 5/04*    (2006.01)
*G01J 5/02*    (2006.01)
(Continued)

(52) U.S. Cl.
CPC ............. *G01J 5/045* (2013.01); *G01J 5/0225* (2013.01); *G01J 5/10* (2013.01); *G01J 5/20* (2013.01);
(Continued)

(58) Field of Classification Search
CPC ...... G01J 5/045; G01J 5/34; G01J 5/20; G01J 5/0225; G01J 5/10; G01J 2005/0077
(Continued)

(56) References Cited

U.S. PATENT DOCUMENTS 6,426,539 B1    7/2002  Vilain et al.
2002/0175284 A1  11/2002  Vilain
(Continued)

FOREIGN PATENT DOCUMENTS

EP    1 243 903 A2    9/2002
EP    1 067 372 B1    1/2004
(Continued)

OTHER PUBLICATIONS

French Preliminary Search report dated Jan. 8, 2016 in French Application 15 51489, filed on Feb. 20, 2015 ( with English translation of Categories of Cited Documents and Written Opinion).
(Continued)

*Primary Examiner* — David Porta
*Assistant Examiner* — Gisselle Gutierrez
(74) *Attorney, Agent, or Firm* — Oblon, McClelland, Maier & Neustadt, L.L.P.

(57) ABSTRACT

A device for detecting electromagnetic radiation, including a substrate; at least one thermal detector, placed on the substrate, including an absorbing membrane suspended above the substrate; and an encapsulating structure encapsulating the thermal detector, including an encapsulating layer extending around and above the thermal detector so as to define with the substrate a cavity in which the thermal detector is located; wherein the encapsulating layer includes at least one through-orifice that is what is referred to as an exhaust vent, each exhaust vent being placed so that at least one thermal detector has a single exhaust vent located facing
(Continued)

the corresponding absorbing membrane, preferably plumb with the center of said absorbing membrane.

14 Claims, 6 Drawing Sheets

(51) Int. Cl.
  *G01J 5/10* (2006.01)
  *G01J 5/20* (2006.01)
  *G01J 5/34* (2006.01)
  *G01J 5/00* (2006.01)

(52) U.S. Cl.
  CPC ......... *G01J 5/34* (2013.01); *G01J 2005/0077* (2013.01)

(58) Field of Classification Search
  USPC ...................................................... 250/338.3
  See application file for complete search history.

(56) References Cited

U.S. PATENT DOCUMENTS

| | | |
|---|---|---|
| 2005/0176179 A1 | 8/2005 | Ikushima et al. |
| 2007/0298534 A1 | 12/2007 | Ikushima et al. |
| 2012/0132804 A1 | 5/2012 | Lee et al. |
| 2013/0087933 A1 | 4/2013 | Pornin et al. |
| 2014/0264712 A1* | 9/2014 | Boutami ................... G01J 5/02 257/467 |
| 2014/0319350 A1 | 10/2014 | Yon et al. |

FOREIGN PATENT DOCUMENTS

| | | |
|---|---|---|
| EP | 2 581 339 A2 | 4/2013 |
| EP | 2 743 659 A1 | 6/2014 |

OTHER PUBLICATIONS

G. Dumont et al. "Current progress on pixel level packaging for uncooled IRFPA", SPIE 8353-52 V.2, 2012, 8 pages.

* cited by examiner

DEVICE FOR DETECTING ELECTROMAGNETIC RADIATION POSSESSING A HERMETIC ENCAPSULATING STRUCTURE COMPRISING AN EXHAUST VENT

TECHNICAL FIELD

The field of the invention is that of devices for detecting electromagnetic radiation, and in particular infrared or terahertz radiation, including at least one thermal detector and an encapsulating structure that forms a hermetic cavity in which the thermal detector is housed, the encapsulating structure including at least one exhaust vent. The invention is especially applicable to the field of infrared imaging and thermography.

STATE OF THE PRIOR ART

A device for detecting electromagnetic radiation, for example infrared or terahertz radiation, comprises at least one thermal detector and conventionally a matrix of thermal detectors that are what are referred to as elementary thermal detectors, in which each detector includes a portion able to absorb the radiation to be detected. With the aim of ensuring the thermal insulation of the thermal detectors, each portion conventionally takes the form of a membrane suspended above the substrate and thermally insulated therefrom by thermally insulating holding elements. These holding elements also provide an electrical function as they are used to electrically connect the thermal detectors to a readout circuit generally placed in the substrate.

To ensure optimal detector operation, a low pressure level is required. For this reason, the detectors are generally confined, or encapsulated, whether alone or in groups of two or more, in hermetic cavities that are under a vacuum or a low pressure.

FIG. 1 illustrates an exemplary detecting device 1 suitable for detecting infrared radiation, and more precisely one pixel of the detecting device, here formed by a bolometric detector 2 resting on a substrate 3 and placed alone in a hermetic cavity 4, such as described in the publication by Dumont et al., Current progress on pixel level packaging for uncooled IRFPA, Proc. SPIE 8353, Infrared Technology and Applications XXXVIII, 83531I2012.

In this example, the detecting device 1 includes an encapsulating structure 5, also called a capsule, that defines the cavity 4 in which the bolometric detector 2 is located. The encapsulating structure 5 includes a thin encapsulating layer 6 that defines with the substrate 3 the cavity 4, and a thin sealing layer 7 that covers the encapsulating layer 6 and ensures the hermeticity of the cavity 4. The encapsulating 6 and sealing 7 layers are transparent to the electromagnetic radiation to be detected.

The detecting device 1 is produced using techniques for depositing thin layers and especially sacrificial layers. During the production process, the sacrificial layers are stripped and removed from the cavity through one or more exhaust vents 8 provided in the encapsulating layer 6. The sealing layer 7 is used, after the sacrificial layers have been removed and the cavity 4 placed under vacuum, to block the exhaust vents 8.

However, the detecting device may see its optical and/or electrical properties, and especially those of the absorbing membrane, modified or even degraded following certain steps of the production process that follow the step of producing the membrane.

SUMMARY OF THE INVENTION

The objective of the invention is to at least partially remedy the drawbacks of the prior art, in particular by providing a device for detecting electromagnetic radiation the optical and/or electrical properties of which and especially the properties of the absorbing membrane of which, are preserved in steps subsequent to the step of producing the membrane.

Another aim of the invention is to provide a detecting device for which the risks of mechanical deterioration of the detector and/or of the encapsulating structure are minimized.

For this purpose, the invention provides a device for detecting electromagnetic radiation, comprising: a substrate; at least one thermal detector placed on the substrate, including a membrane suitable for absorbing the radiation to be detected, which membrane is suspended above the substrate and thermally insulated therefrom by thermally insulating holding elements; and an encapsulating structure encapsulating said at least one thermal detector, including an encapsulating layer extending around and above said at least one thermal detector so as to define with the substrate a cavity in which said at least one thermal detector is located.

According to the invention, the encapsulating layer comprises at least one through-orifice that is what is referred to as an exhaust vent, each exhaust vent being placed so that at least one thermal detector has a single exhaust vent located facing the corresponding absorbing membrane, preferably plumb with the centre of said absorbing membrane.

According to one embodiment, a plurality of thermal detectors is placed in said cavity, the encapsulating layer comprising a plurality of exhaust vents placed so that at least some of said thermal detectors each have a single exhaust vent located facing the corresponding absorbing membrane. Alternatively, a single thermal detector is placed in said cavity, the encapsulating layer then comprising a single exhaust vent located facing the absorbing member of the thermal detector. In other words, the single vent is located plumb with the absorbing membrane, i.e. perpendicular to the absorbing membrane. The single vent is therefore not located facing anchoring pins or thermally insulating arms.

Each absorbing membrane may include a through-orifice located plumb with the corresponding exhaust vent and of a size equal to or larger than that of said vent. In other words, said absorbing membrane, facing which is located an exhaust vent, may include a through-orifice located plumb with said exhaust vent and of a size equal to or larger than that of said vent.

The absorbing membrane may include a stack of a bolometric layer, a dielectric layer that is structured so as to form two separate portions, and an electrically conductive layer that is structured so as to form three electrodes, two of said electrodes, which are intended to be raised to the same electrical potential, flanking the third electrode, which is what is referred to as the central electrode and which is intended to be raised to a different electrical potential, each electrode making contact with the bolometric layer, the central electrode being electrically insulated from the other electrodes by the dielectric layer, the orifice passing through the central electrode and the bolometric layer in a zone located between the portions of the dielectric layer.

The encapsulating structure may furthermore include a sealing layer covering the encapsulating layer so as to make the cavity hermetic, the substrate comprising a fixing layer placed facing the through-orifice of the corresponding membrane and suitable for ensuring the adhesion of the material of the sealing layer.

The fixing layer may extend under the whole of the corresponding membrane and be made of a material suitable for furthermore reflecting the electromagnetic radiation to be detected.

The exhaust vent may have a transverse profile, in a plane orthogonal to the plane of the substrate, the width of which increases with distance from the substrate.

The encapsulating structure may furthermore include a sealing layer covering the encapsulating layer so as to make the cavity hermetic, the sealing layer including a border that extends in the direction of the thickness of the sealing layer, from the border of the exhaust vent, with a non-zero angle α relative to an axis orthogonal to the plane of the substrate, the transverse profile of the exhaust vent making an angle η to the same orthogonal axis larger than the angle α.

The longitudinal end of the exhaust vent may have a circularly arcuate shape, or be formed from a succession of substantially straight segments that are inclined relative to one another.

The detecting device may include a matrix of thermal detectors, in which the encapsulating layer comprises at least one portion, which is what is referred to as an internal bearing portion, or support portion, located between two adjacent detectors, and which bears directly against the substrate.

The internal bearing portion may have a profile, in a plane parallel to the plane of the substrate, of oblong shape, preferably with rounded longitudinal ends.

The internal bearing portion may include a sidewall and a bottom part, said sidewall extending in a plane substantially orthogonal to the plane of the substrate over the entire height of the cavity, and the bottom part making contact with the substrate.

At least one internal bearing portion may be placed between two adjacent absorbing membranes and two adjacent holding pins, each of said holding pins participating in the holding of said adjacent membranes, and in which the internal bearing portion is oriented longitudinally alongside said membranes.

The encapsulating layer may comprise a peripheral wall that encircles the matrix of detectors, and that has a cross section, in a plane parallel to the plane of the substrate, of square or rectangular shape the corners of which are rounded.

The thermally insulating holding elements may include holding pins, the fixing layer furthermore including portions on which the holding pins rest, and/or portions on which internal bearing portions of the encapsulating layer rest, and being made from a material able to ensure the adhesion of the holding pins and/or the bearing portions.

BRIEF DESCRIPTION OF THE DRAWINGS

Other aspects, aims, advantages and features of the invention will become more clearly apparent on reading the following detailed description of preferred embodiments thereof, this description being given by way of nonlimiting example and with reference to the appended drawings in which, apart from FIG. 1 which was discussed above.

DETAILED DESCRIPTION OF PARTICULAR EMBODIMENTS

In the figures and in the rest of the description, references that are the same represent identical or similar elements.

Figure 2:
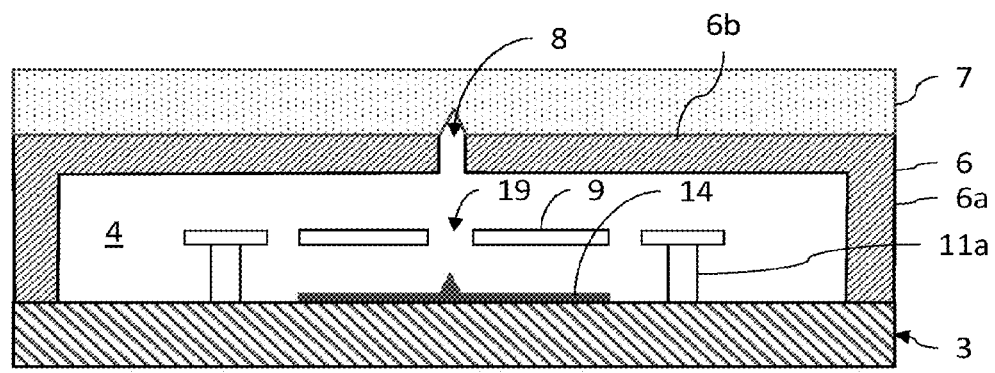
FIG. 2 is a schematic cross-sectional view of a detecting device according to one embodiment, in which a single exhaust vent per detector is placed facing the suspended membrane of the detector.

FIG. 2 illustrates an exemplary device for detecting electromagnetic radiation according to one embodiment.

Figure 1:
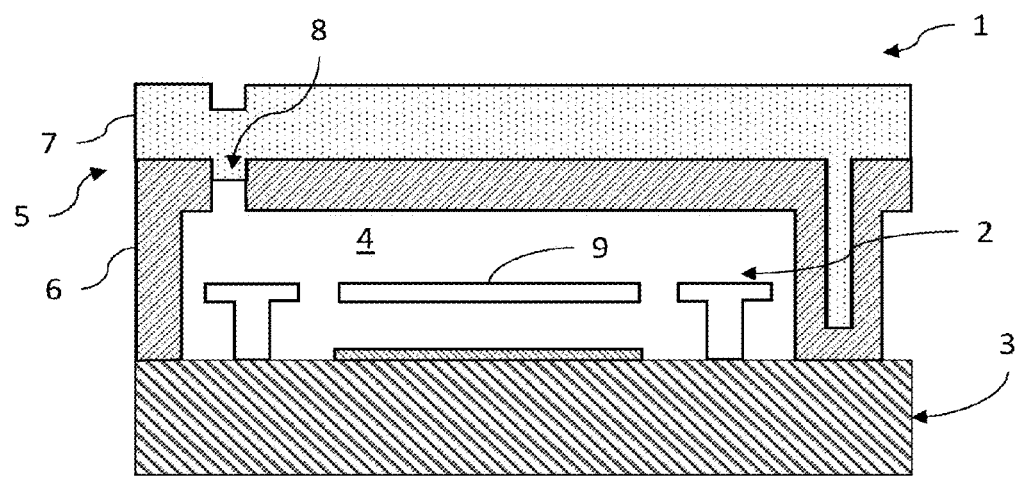

In this example, the device 1 for detecting electromagnetic radiation is suitable for detecting infrared or terahertz radiation. It includes a matrix of thermal detectors 2 that are what are referred to as elementary detectors. FIG. 1 is a partial view of the detecting device and shows only a single detector placed in a cavity.

It comprises a substrate 3, for example made of silicon, comprising a readout circuit (not shown) for example produced in CMOS technology, allowing the biases required to operate the detectors and read the information issued therefrom to be applied.

The thermal detector 2 comprises a portion suitable for absorbing the radiation to be detected. This absorbing portion is generally thermally insulated from the substrate and may be placed on a membrane 9, which is what is referred to as an absorbing membrane, suspended above the substrate 3 by thermally insulating holding elements 11 such as anchoring pins 11a associated with thermally insulating arms 11b. The membranes 9 are spaced apart from the substrate 3 by a distance typically comprised between 1 µm and 5 µm, and preferably 2 µm when the detectors are designed to detect infrared radiation of wavelength comprised between 8 µm and 14 µm.

In the rest of the description, the thermal detector 2 is a bolometer the absorbing membrane 9 of which includes a thermistor material the electrical conductivity of which varies as a function of the heating of the membrane. However, this example is given by way of illustration and is nonlimiting. Any other type of thermal detector may be used, for example ferroelectric or pyroelectric detectors or even thermopiles.

In this example, a pixel of the detecting device includes a detector 2 and its own anchoring pins 11a and thermally insulating arms (not shown). Other configurations are possible, especially when a matrix of detectors is placed in one and the same cavity. In this case, the detectors may be arranged close together, especially by connecting the thermally insulating arms of various neighbouring thermal detectors to a given anchoring pin, the read architecture of the thermal detectors then being adapted, as documents EP1106980 and EP1359400 describe. An improvement in the sensitivity of the detectors results, therefrom due to the increased length of the insulating arms and an increase in the fill factor achieved by decreasing the area of each pixel not dedicated to the absorption of electromagnetic radiation. The detecting device is thus particularly appropriate for small matrix pitches, for example between 25 μm and 17 μm, or even 12 μm.

The detecting device 1 includes an encapsulating structure 5, or capsule, that defines, with the substrate 3, a hermetic cavity 4 inside of which the thermal detector 2 is here placed. The encapsulating structure 5 is formed from a thin encapsulating layer 6 that is deposited so that it has a peripheral wall 6a that encircles the detector 2 and a top wall 6b that extends above the detector 2. The top wall 6b is substantially planar and extends above the suspended membrane 9 at a distance therefrom for example comprised between 0.5 μm and 5 μm, preferably 1.5 μm. The encapsulating layer includes at least one through-orifice that is what is referred to as an exhaust vent, which through-orifice is intended to allow the sacrificial layers to be removed during the process for producing the device. The vent forms a local aperture in the encapsulating layer 6 opening into the cavity 4.

The encapsulating structure furthermore includes a sealing layer that covers the encapsulating layer and plugs the exhaust vent. This sealing layer conventionally has an additional antireflection function.

The encapsulating layer 6 includes at least one exhaust vent 8 placed so that at least one thermal detector 2 present in the cavity 4 has a single exhaust vent 8 located facing its absorbing membrane 9, preferably plumb with the centre of the absorbing membrane 9. In other words, the single vent 8 is located plumb with the absorbing membrane 9, i.e. perpendicular to the absorbing membrane 9. The single vent 8 is therefore not located facing the anchoring pins 11a or thermally insulating arms 11b.

The inventors have observed that positioning a single vent facing the absorbing membrane of the thermal detector makes it possible to avoid, after removal of the sacrificial layers, the presence of sacrificial layer residues attached to the membrane. The presence of these residues has especially been observed when at least two vents per detector are placed on either side of the membrane. The residues are generally located in a zone equidistant from the various vents, in which zone the suspended membrane is located. They may modify the optical and/or electrical and/or thermal properties of the membrane (for example by increasing the mass of the membrane, thereby decreasing the response time of the detector), or even modify the residual pressure level under the effect of gradual degassing. In addition, production of the vent is simplified by its distance from the zones of high topography that are the trenches (described below), thereby allowing a good dimensional control of the shape of the vent to be obtained.

In the case where the cavity 4 houses a single thermal detector 2, the encapsulating layer 6 then comprises a single exhaust vent 8 located facing the absorbing membrane 9 of the thermal detector. In general, the detecting device includes a matrix of thermal detectors 2 in which each detector is encapsulated in a single cavity. The encapsulating structure then includes a matrix of cavities all formed by the same encapsulating layer. Level with each cavity, the encapsulating layer includes a single exhaust vent placed facing the absorbing membrane of the detector housed in the cavity.

In the case where the cavity 4 houses a plurality of thermal detectors 2, the encapsulating layer then includes at least one exhaust vent and preferably a plurality of exhaust vents placed so that at least some of said thermal detectors 2 each have a single exhaust vent 8 located facing the corresponding absorbing membrane 9. Each thermal detector of the matrix may have a single vent placed facing the corresponding absorbing membrane. Alternatively, only some of the thermal detectors may each have a single exhaust vent located facing the corresponding membrane. It is then advantageous, for a row or a column of thermal detectors, for the exhaust vents to be placed above every Nth uneven detector. This makes it possible to avoid the presence of sacrificial layer residues on the absorbing membrane of a detector not provided with an exhaust vent. By way of example, in the case where N=3, two neighbouring detectors not provided with an exhaust vent are placed between two detectors each provided with a single exhaust vent. In this example, none of the thermal detectors, whether they are or are not provided with an exhaust vent, will see their absorbing membrane degraded by the presence of sacrificial layer residues. This variant embodiment is particularly advantageous in the case of small matrix pitches, for example when the positional pitch of the detectors is about 12 μm or less.

It is advantageous to provide a through-orifice 19 in the membrane 9 of the detector, located plumb with the corresponding vent 8, and the size of which is equal to or larger than the size of the vent 8, so as to achieve a margin of safety allowing for possible misalignment of the vent and/or orifice of the membrane, which may be about 200 nm to 500 nm. Thus, during the deposition of the sealing layer, a part of the sealing material that is liable to fall through the vent will not be deposited on the membrane but will instead pass through the orifice of the membrane and be deposited on the substrate.

It is then advantageous to provide a fixing layer, under the membrane 9, in line with the through-orifice 19, in order to ensure that the fallen sealing agglomerate, if there is one, remains held in place. Thus, in the step of sealing the cavity, in the case where a quantity of sealing layer material passes through the vent, said quantity will deposit on and adhere to the fixing layer. This especially makes it possible to relax constraints on the type of material present on the surface of the substrate, and more precisely on the material used to passivate the topside of the substrate.

This fixing layer 14 may extend, continuously or discontinuously, over various zones of the cavity, and more precisely under the membrane 9 and facing its through-orifice 19, in order to ensure attachment of the sealing material liable to fall through the vent 8; under the entirety of the membrane 9 in order to provide an optical function enabling reflection of the radiation to be detected; level with various trenches in order to protect the substrate 3 during the etching step used to form the trenches and to improve the attachment of the encapsulating layer 6 to the substrate; and level with the anchoring pins 11a in order to improve the attachment of the pins to the substrate and improve the electrical conduction between the pins and the read circuit placed in the substrate. The thickness of this fixing layer is preferably constant over its entire extent, and especially in the various aforementioned zones. This fixing layer may be made of chromium or titanium, aluminium or titanium nitride and optionally takes the form of a stack of sublayers made from these materials, or of another suitable material, and may have a thickness of about 100 nm to 400 nm.

Figure 3:
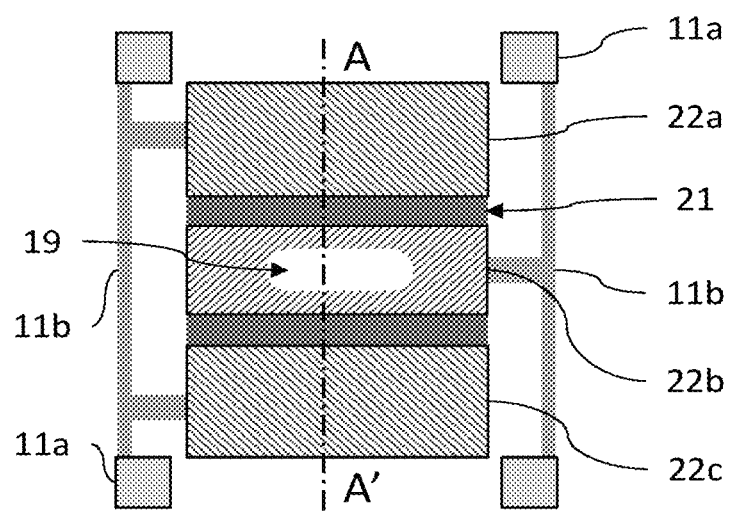
FIGS. 3 and 4 are schematic views of a detecting device according to another embodiment, a top view (FIG. 3) and a cross-sectioned view (FIG. 4), in which the suspended membrane includes an intermediate dielectric layer.
Figure 4:
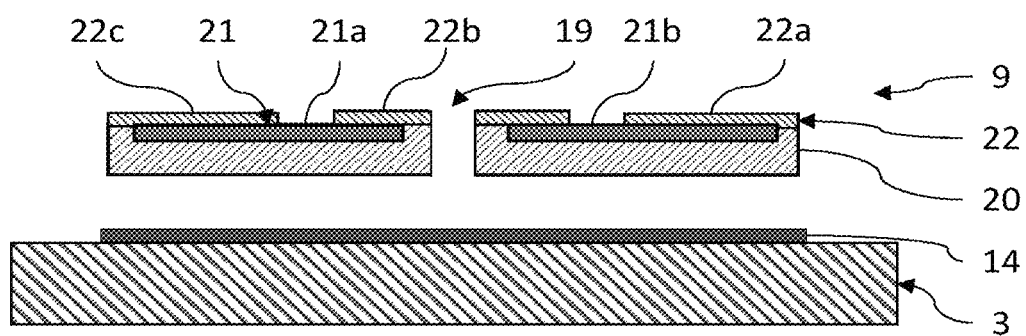

According to one embodiment shown in FIGS. 3 and 4, the detectors 2 the membrane 9 of which includes a through-orifice 19 have a membrane architecture with an intermediate electrical insulation, such as described in document EP1067372.

FIG. 3 is a top view of an absorbing membrane 9 of a bolometric detector with this type of architecture. It is connected to four anchoring pins 11a and is suspended by way of two thermally insulating arms 11b. FIG. 4 is a cross-sectional view in the plane A-A in FIG. 3.

The membrane 9 includes a layer of a bolometric (and therefore resistive) material 20, for example doped amorphous silicon or vanadium oxide. It also includes a layer of a dielectric material 21 that is placed on the bolometric layer 20 and that covers the latter in two separate zones 21a, 21b.

It also includes a layer of an electrically conductive material 22, which layer is deposited on the dielectric layer 21 and the bolometric layer 20 and locally etched over the entire width of the membrane as far as the dielectric layer, so as to form three separate conductive portions 22a, 22b, 22c. The conductive layer 22 extends onto the insulating arm 11b in order to electrically connect the three portions 22a, 22b, 22c to the readout circuit. Among the three conductive portions, two portions 22a, 22c located at the ends of the membrane 9 are electrically connected to two portions of the same insulating arm 11b and thus form two electrodes intended to be raised to the same electrical potential. These two end portions 22a, 22c flank a central portion 22b connected to another insulating arm that forms an electrode intended to be raised to another electrical potential.

The dielectric layer 21 is etched so that each electrode 22a, 22b, 22c makes electrical contact with the bolometric material 20 and so that the end electrodes 22a, 22c are electrically insulated from the central electrode 22b.

In this embodiment, the absorbing membrane 9 includes a through-orifice 19, here of oblong profile, placed at the centre of the central electrode 22b. Preferably, the orifice 19 is placed level with where the dielectric layer 21 is etched. The orifice 19 thus only passes through the central electrode 22b and the bolometric layer 20. Preferably, the distance, measured in the direction of the width of the orifice 19, between the border of the orifice and the border of the dielectric layer 21, facing the orifice, is larger than or equal to the thickness of the bolometric layer 20 making contact with the central electrode 22b in this zone. Any influence the orifice might have on the electrical properties of the absorbing membrane is minimized or even suppressed by positioning the orifice in this way.

The example described with reference to FIGS. 3 and 4 shows a bolometric layer 20 in the bottom portion of the membrane 9, on which the dielectric layer 21 and the electrodes 22a, 22b, 22c rest. However, an inverted arrangement of the layers is also producible, in which the electrodes 22a, 22b, 22c are located in the bottom portion of the membrane 9, on which electrodes rest the dielectric layer 21 then the bolometric layer 20.

Figure 5:
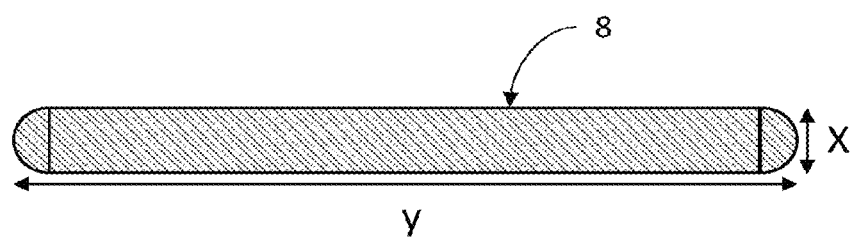
FIG. 5 is a schematic representation of a top view of an exhaust vent according to one embodiment, in which the vent has an oblong-shaped profile with rounded edges.

According to one embodiment shown in FIG. 5, the profile of the exhaust vent 8, in a plane parallel to the plane of the substrate, has an oblong, i.e. elongate, shape. Its small dimension X, measured in the direction of the width of the vent, is chosen so as to ensure effective sealing of the vent, and its large dimension Y, measured in the direction of the length of the vent, may be adjusted to facilitate the transit of reactive species and reaction products of the etching of the material of the sacrificial layers during removal, thereby allowing the time taken to remove the sacrificial layers to be optimized. In this respect, the width X may typically be comprised between about 150 nm and 600 nm, whereas the large dimension Y may be about a few microns, 5 μm for example.

In addition, the oblong shape of the vent 8 has at least one rounded longitudinal end, and preferably both longitudinal ends are rounded. A longitudinal end is an end of the vent along the longitudinal axis thereof. By way of example, the rounded shape of an end may be a circular arc the radius of curvature of which may be equal to half the average width X of the vent. More generally, it may correspond to a continuous, circular or elliptical, curved shape, such as in the example in FIG. 5, or to a succession of right or substantially curved segments.

The inventors have shown that this vent shape makes it possible to avoid the risk of cracks initiating in the encapsulating layer 6 and propagating through the sealing layer 7. Specifically, it is essential to prevent any risk of cracks that are liable to break the hermeticity of the cavity, above all when one cavity houses a detector matrix, because a local hermeticity flaw could lead to operational failure of the entire device. In addition, the step of removing the sacrificial layers is optimized, especially in terms of the time taken to remove the sacrificial layers, by way of a combined effect of the oblong shape of the vent and the central position thereof with respect to the detector.

Figure 6:
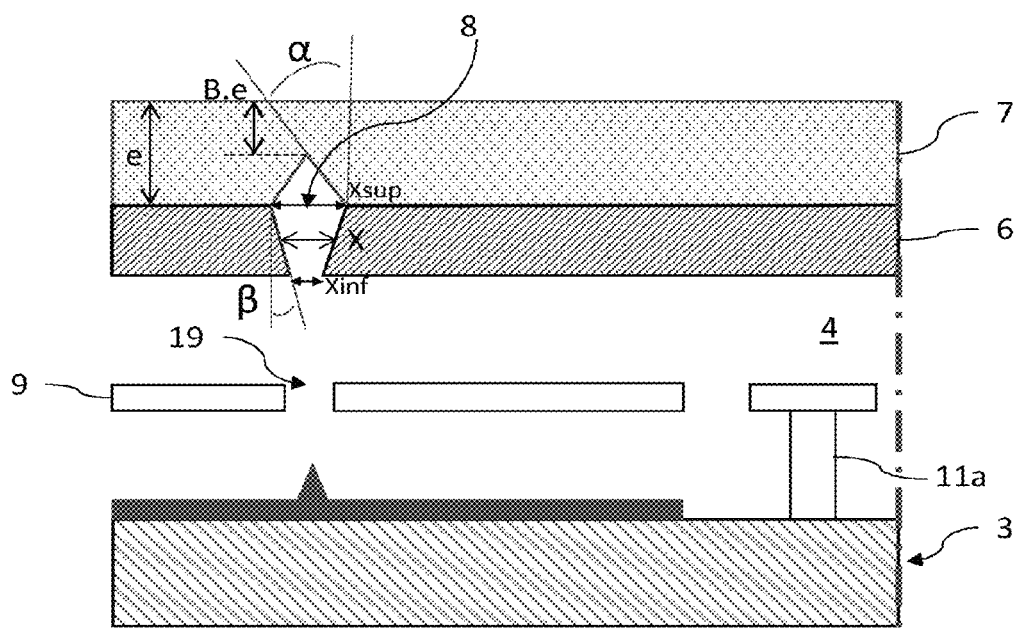
FIG. 6 is a schematic cross-sectional view of a detecting device according to another embodiment, in which the transverse profile of the vent is flared toward the sealing layer.

As FIG. 6 shows, the inventors have observed that the sealing layer 7, bordering the vents 8, has a tendency to extend vertically, i.e. in the direction of the thickness of the layer 7, with a non-zero angle α relative to the normal, i.e. relative to an axis orthogonal to the plane of the substrate, in particular when a vacuum thin-film deposition technique, such as low-pressure sputtering or evaporation, is used. The average width X of the vents may be chosen depending on the thickness e of the deposited sealing layer 7, on the fractional thickness B of the sealing layer actually ensuring the hermeticity, and on the growth angle α, from the following relationship:

$$X = 2 \cdot e \cdot (1-B) \cdot \tan(\alpha)$$

By way of example, when an evaporation technique is used to deposit the sealing layer, the angle α is typically about 15° to 20°. For a thickness e of sealing layer of 1800 nm, and if it is desired for 1200 nm of layer to ensure the hermeticity (B=2/3), an average vent width X of about 320 nm to 410 nm is obtained.

Moreover, as shown in FIG. 6, it is advantageous for the exhaust vent 8 to have a cross section, in a plane orthogonal to that of the substrate, that has a shape the width of which increases with distance from the substrate 3. In other words, the vent 8 has a transverse profile that is flared toward the exterior of the cavity. It is therefore narrower level with its bottom orifice opening onto the cavity and wider level with its top orifice opening outside of the cavity. By way of example, the width $X_{inf}$ level with the bottom orifice may be about 100 nm to 350 nm whereas the width $X_{sup}$ level with the top orifice may be about 250 nm to 800 nm. In this example, the encapsulating layer 6 has a thickness of about 800 nm. As a result of this shape of the cross section of the vent 8, the quality of the seal sealing the vent may be improved. More precisely, for a given thickness e of sealing layer, the inventors have observed that the fraction B of layer that actually provides the seal is larger in the case where the vent has a right cross section, thereby improving the quality of the seal.

Such a vent cross section may be obtained by generating a slope in the flanks of the resist before etching of the vent, either by post-development reflow or by modifying the conditions of exposure and/or development of the resist (exposure dose, focus, temperature and duration of post-exposure anneals) as is known by those skilled in the art. Such a vent cross section may also be obtained during the dry etching of the vent by adding an isotropic component to the etching, for example by adding oxygen to the chemistry used to etch the vent. In the case where the encapsulating layer 6 is made of silicon, the addition of fluorine-containing gases, such as $SF_6$ or $CF_4$, to the etching chemistry will also contribute to increasing the isotropic component of the etching.

The beneficial effect of this particular vent profile especially manifests itself when the angle β that the profile of the vent makes to the normal to the substrate is larger than the angle α defined above. By way of example, for an encapsulating layer thickness of 800 nm and for an orifice width $X_{inf}$ of 100 nm, the width $X_{sup}$ of the top orifice may be larger than 530 nm) (β=15°, or even larger than 680 nm (β=20°).

Figure 7:
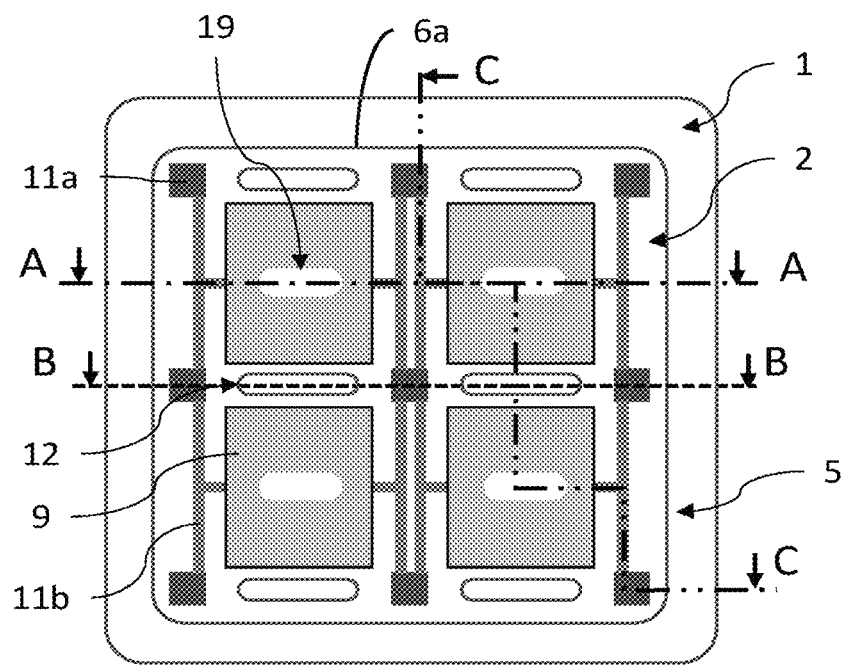
FIGS. 7 to 9 are schematic views of a detecting device according to another embodiment, in which the encapsulating structure includes internal bearing portions.
Figure 8:
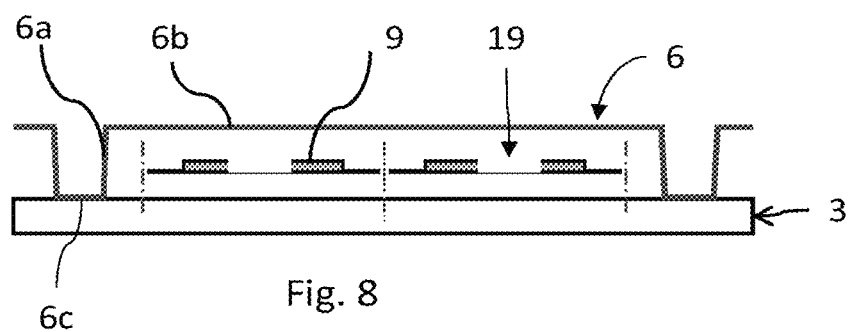
Figure 9:
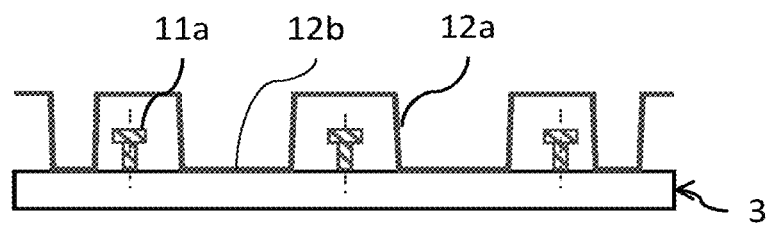

According to one embodiment, shown in FIGS. 7, 8 and 9, the detecting device includes a detector matrix placed in one and the same cavity 4. The encapsulating structure 5 furthermore includes at least one internal bearing portion 12 located between two adjacent detectors 2, and preferably a plurality of internal bearing portions. Certain internal bearing portions may furthermore be placed on the periphery of the matrix of detectors 2, bordering the cavity 4. The internal bearing portions 12 are formed by the thin encapsulating layer 6, which thus includes the peripheral wall 6a, the top wall 6b and the internal bearing portions 12.

The internal bearing portions 12 rest (or bear) directly on (or against) the substrate 3. In other words, they make direct contact with the substrate. These internal bearing portions 12 thus allow the mechanical strength of the capsule 5 to be reinforced. The adherence of the capsule 5 to the substrate 3 is thus ensured on the one hand by a bottom portion of the peripheral wall 6a of the encapsulating layer 6, which rests on the substrate on the periphery of the cavity, and on the other hand by the one or more internal bearing portions 12 placed in the cavity. This multiplicity of contact areas, distributed bordering the cavity and inside thereof, makes it possible to increase the mechanical strength of the capsule.

By resting directly on or bearing directly against the substrate, what is meant is that the internal bearing portions 12 make direct contact with the substrate 3, independently of whether this is with the material making up the substrate or with a thin layer, for example a passivating layer or a fixing layer, deposited on the surface of the substrate, and independently of whether these thin layers extend continuously or not. The internal bearing portions therefore do not rest on the substrate via three-dimensional elements such as the elements holding the suspended membranes.

Specifically, the inventors have observed that, when bearing portions of the encapsulating layer rest, not on the substrate, but on the elements holding the suspended membranes and more precisely on the anchoring pins, problems arise with adhesion of the capsule to the substrate, which may lead to debonding or even destruction of the capsule. Specifically, it would appear that the anchoring pins provide a contact area and planarity that are insufficient to ensure a good adhesion of the bearing portions of the encapsulating layer. The detecting device according to the invention thus decreases the risk of the capsule debonding, this risk being related to mechanical stresses in the thin layers of the capsule, whether it be a question of stresses that are intrinsic to said thin layers or extrinsic stresses resulting from differential thermal expansion of the capsule with respect to the substrate.

Thus, the encapsulating structure 5 defines a hermetic cavity 4 that houses the matrix of thermal detectors 2, this cavity 4 taking the form of a network of intercommunicating sub-cavities, or cells, that each house a thermal detector subassembly. The cells are separated from each other by the internal bearing portions. As explained above, this network of cells is delimited by one and the same encapsulating layer 6, which extends so as to form the peripheral wall 6a and top wall 6b of the cavity 4 and the internal bearing portions 12.

Thus, the device 1 for detecting radiation includes a hermetic cavity 4 that houses a plurality of thermal detectors 2, the mechanical strength of the cavity being reinforced by the presence of the one or more internal bearing portions 12 that rest directly on the substrate 3. Housing a plurality of thermal detectors 2 in the cavity allows the fill factor to be increased, for example by decreasing the matrix pitch or by increasing the size of the absorbing membranes 9, or even by mutualizing the anchoring pins 11a. Moreover, parasitic electrical coupling between detectors 2 is avoided in so far as the internal bearing portions 12 do not make contact with the anchoring pins. This device furthermore allows the length of the thermally insulating arms 11b to be increased in order to improve the thermal insulation of the absorbing membranes 9.

FIG. 8 is a cross-sectional view in the plane A-A of the detecting device 1 shown in FIG. 7. It shows in greater detail the encapsulating layer 6 extending around and above the matrix of detectors 2 so as to form the cavity 4. The peripheral wall 6a forms the border of the cavity and the top wall 6b extends above the detectors 2. The peripheral wall 6a has a peripheral bottom portion 6c that bears (or rests) directly against (or on) the substrate, so as to ensure adhesion of the capsule to the substrate.

FIG. 9 is a cross-sectional view in the plane B-B of the detecting device 1 shown in FIG. 7. In this figure, the internal bearing portions 12 each comprise a peripheral sidewall 12a and a bottom portion 12b, and bear directly against the substrate 3 via the bottom wall 12b. In other words, each internal bearing portion 12 makes contact directly with the substrate 3, whether this be with the constituent material of the substrate 3 or, as mentioned above, with a thin layer deposited on the surface of the substrate.

As shown in FIG. 7, the internal bearing portions 12 may have a profile, in the plane of the substrate, of oblong, i.e. elongate, shape. They may each be placed between two adjacent suspended membranes and two neighbouring anchoring pins, so as to optimize the fill factor. The ends of the oblong profile of the internal bearing portions 12 may be rounded, so as to strengthen the adherence of the latter to the substrate 3 by improved distribution of mechanical stresses. The width of the internal bearing portions may be smaller than 1.5 μm and for example comprised between 0.5 μm and 0.8 μm, and their length may be adjusted depending on the space available between the detectors and especially the anchoring pins.

In the example in FIG. 7, the thermally insulating arms 11b mainly extend along a first axis, and the internal bearing portions 12 of the capsule 5 extend along a second axis orthogonal to the first axis, between two adjacent membranes 9 and two neighbouring anchoring pins 11a. The width and length of the internal bearing portions may be optimized by taking advantage of the area left free in this zone by the absence of thermally insulating arms. The area of the internal bearing portions making contact with the substrate may thus be large, thereby improving the adherence and mechanical strength of the capsule.

Figure 10:
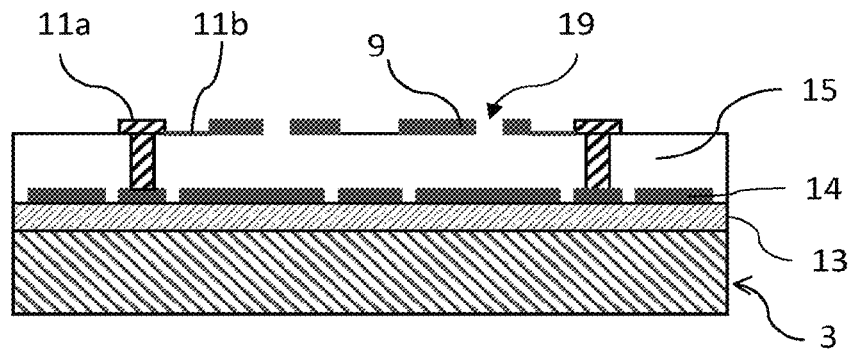
FIGS. 10 to 12 are cross-sectional views of the detecting device shown in FIG. 7, at various stages of its production process.
Figure 11:
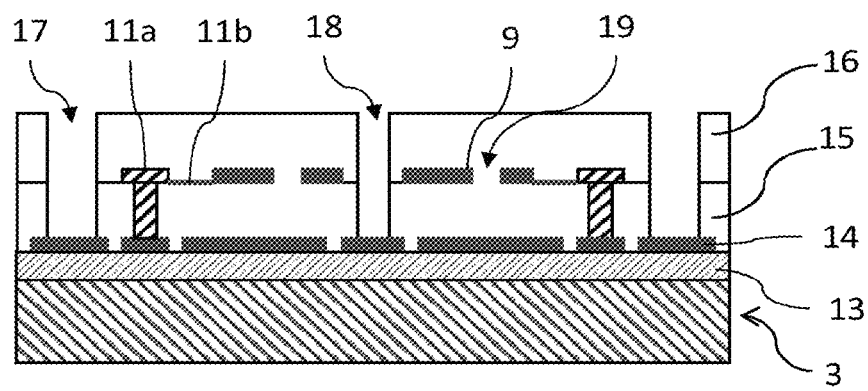
Figure 12:
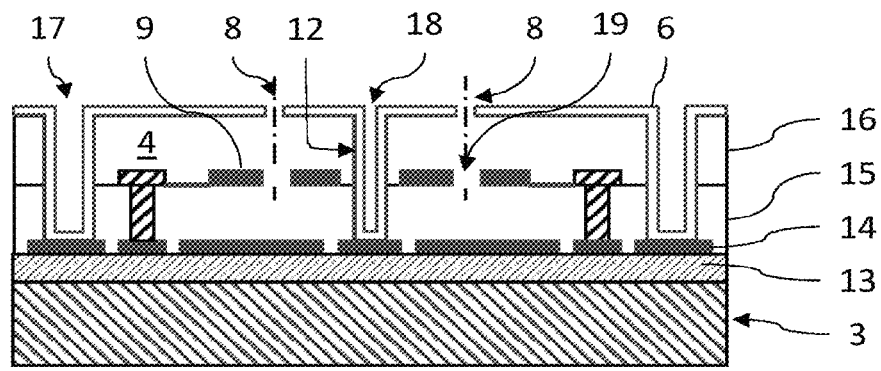

An exemplary production process is now detailed, with reference to FIGS. 10 to 12, which are cross-sectional views, along the axis C-C, of the detecting device shown in FIG. 7.

The detecting device 1 comprises a substrate 3 in which a circuit for reading and controlling the thermal detectors 2 is provided. The substrate 3 may comprise a passivating layer 13, for example made of silicon oxide SiO or silicon nitride SiN. According to one embodiment that is detailed below, the substrate 3 may also comprise an optionally continuous fixing layer 14 deposited on the passivating layer 13. The fixing layer 14 may be made from titanium or chromium, and have a thickness for example comprised between about 100 nm and 300 nm.

As is known per se, a first sacrificial layer 15 is deposited and the anchoring pins 11a, the thermally insulating arms 11b and the absorbing membranes 9 are produced in and on this sacrificial layer 15. The sacrificial layer may be made from polyimide or even an inorganic material such as silicon oxide, polysilicon or amorphous silicon.

Steps of photolithography and etching are carried out to form through-orifices 19 in the absorbing membranes 9.

As illustrated in FIG. 11, a second sacrificial layer 16 is then deposited on the first sacrificial layer 15, anchoring elements 11a, thermally insulating elements 11b, and absorbing membranes 9. It is preferably made of the same material as that of the first sacrificial layer 15 and has a thickness for example comprised between 0.5 μm and 5 μm.

Steps of photolithography and etching, for example RIE etching, are carried out so as to form, preferably during a sequence of common steps, trenches 17, 18 right through the thickness of the sacrificial layers, i.e. as far as the substrate 3 and, more precisely, here as far as the fixing layer 14. A first trench 17, intended for subsequent production of the peripheral wall of the encapsulating structure, is produced so as to extend continuously around the matrix of detectors 2, and at least one and preferably a plurality of second trenches 18 are produced between two adjacent detectors 2 with the aim of allowing the internal bearing portion(s) to be subsequently formed. The first and second trenches 17, 18 have a substantially identical depth, so that the peripheral wall of the encapsulating structure and the sidewalls of the bearing portions have in fine a substantially identical height. The process is thus simplified, especially as regards the control of the etch depth.

In the case where the sacrificial layers 15, 16 are made of polyimide, the process for producing the trenches may involve depositing an inorganic protective layer (not shown), for example made of SiN or SiO, or even of amorphous silicon, on the surface of the second sacrificial layer 16. A photolithography step then allows apertures to be defined in a resist layer in the locations where the etching of the trenches is to be carried out. The etching of the trenches is then carried out in 2 steps, a first step in which the protective layer is etched, for example by RIE etching, plumb with the apertures in the resist, and a second step in which the first and second sacrificial layers are etched, for example by RIE etching, as far as the substrate, plumb with the apertures obtained in the protective layer in the first etching step. At this stage, the protective layer may be removed.

This sequence of steps is justified by constraints on the chemical compatibility of the layers present and by geometric constraints (aspect ratio of the trenches). Specifically, the resist layer disappears in the second step of etching of the polyimide as these layers are all of organic nature, and therefore similarly sensitive to the etching chemistry implemented in the second step. The aperture in the protective layer is thus used as a relay to continue to limit the etching to the zones in which it is desired to produce the trenches. The process of the second etching step is moreover adapted to guarantee a high etching anisotropy, thereby allowing high aspect ratios and vertical sidewalls to be obtained without undercutting. It is furthermore adapted to guarantee a high selectivity on the one hand over the protective layer (made of SiN or SiO) and on the other hand over the surface of the substrate, generally covered with an insulating passivating layer made of SiO or SiN. This high selectivity is advantageous because it allows the thickness of the protective layer to be decreased (typically to 30 nm), this being of a nature to facilitate its subsequent removal.

The trenches 17, 18, and especially the second trenches 18 intended for production of the internal bearing portions, have a high aspect ratio. By way of example, trenches of width smaller than or equal to 1.5 μm, for example comprised between 0.5 μm and 0.8 μm, may be produced in a polyimide layer of thickness comprised between 2 μm and 6 μm, 4 μm for example. The length of the second trenches 18 may be adapted depending on constraints on the compact integration and robustness of the capsule, and may be about a few microns to a few millimeters. These trench dimensions make it possible to produce a matrix of thermal detectors having a particularly small matrix pitch, for example 17 μm or even 12 μm.

The fixing layer 14 is preferably made from a material over which the etching of the trenches is selective, so as to avoid any etching of the substrate. The material may be titanium or chromium and the fixing layer may have a thickness of about 100 nm to 300 nm.

As shown in FIG. 12, a thin encapsulating layer 6, which is transparent to the radiation to be detected, is then deposited using a conformal deposition technique suitable for obtaining a good coverage of the vertical flanks of the trenches 17, 18, with a substantially constant layer thickness. It may for example be a question of an amorphous silicon layer produced by CVD or by iPVD, of a thickness typically comprised between about 200 nm and 2000 nm when it is measured on a flat surface. The deposition of the encapsulating layer 6 on a surface structured with trenches including at least one continuous peripheral trench 17 (closed perimeter) leads to the formation of the capsule 5, produced with the material of the encapsulating layer and forming, making contact with the substrate 3, a cavity 4 in which the matrix of detectors is housed. The coverage of the flanks of the internal trenches 18 by the encapsulating layer 6 allows the shape of the internal trenches to be reproduced in order to form internal bearing portions 12, preferably of oblong shape with rounded ends. It will be noted that these internal bearing portions 12 may be solid or hollow (made up of two spaced-apart walls) depending on whether the width of the internal trenches 18 is small or large relative to the thickness of the encapsulating layer 6, respectively.

Through-orifices, forming exhaust vents 8 intended to allow the removal of the sacrificial layers 15, 16 from the cavity 4, are then produced by photolithography and etching in the encapsulating layer 6, and positioned plumb with the through-orifices 19 of the membranes 9. Each vent 8 has a profile, in a plane parallel to the plane of the substrate, of oblong shape with rounded ends. Preferably, the profile of each vent, in a plane orthogonal to that of the substrate, has a flared shape that widens with distance from the substrate.

Next, the sacrificial layers 15, 16 are removed by preferably gas-phase or vapour-phase (depending on the nature of the sacrificial layers) chemical attack (gas-phase attack is used in the polyimide case described here), so as to form the cavity 4 housing the matrix of detectors 2, and the internal bearing portions 12. By virtue of the oblong shape of the vent, this step is optimized in terms of duration.

A sealing layer (not shown in FIG. 12) is then deposited on the encapsulating layer 6 with a sufficient thickness to ensure the exhaust vents 8 are sealed, or blocked. The quality of the hermeticity is reinforced by virtue of the rounded ends of the oblong shape of the vents 8, and by virtue of the flared shape of the vents.

The sealing layer is transparent to the electromagnetic radiation to be detected and may have an antireflection function in order to optimize the transmission of the radiation through the encapsulating structure. In this respect, it may be formed from sublayers of germanium and zinc sulphide in the case where the radiation to be detected lies in the wavelength range extending from 8 µm to 12 µm, for example a first sublayer of germanium of about 1.7 µm thickness then a second sub-layer of zinc sulphide of about 1.2 µm thickness. The sealing layer is preferably deposited by a vacuum thin-film deposition technique such as electron-beam vacuum evaporation (EBPVD) or such as ion beam or cathode sputtering. Thus a hermetic cavity 4 under vacuum or low pressure is obtained in which the matrix of thermal detectors 2 is housed.

Figure 13:
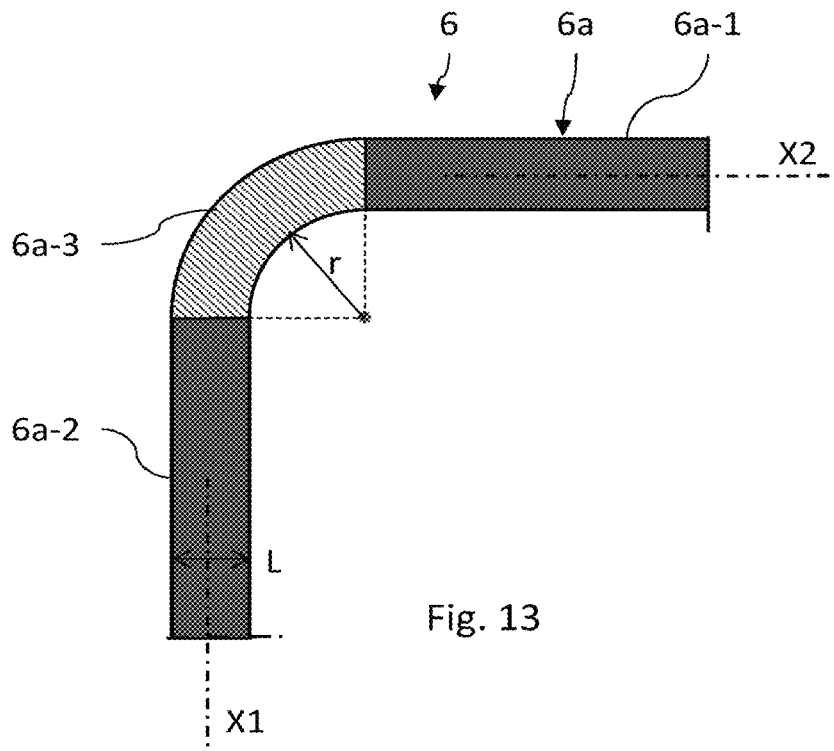
FIGS. 13 and 14 are partial schematic representations of top views of the peripheral wall of the encapsulating layer according to one embodiment, in which the wall includes a rounded section.
Figure 14:
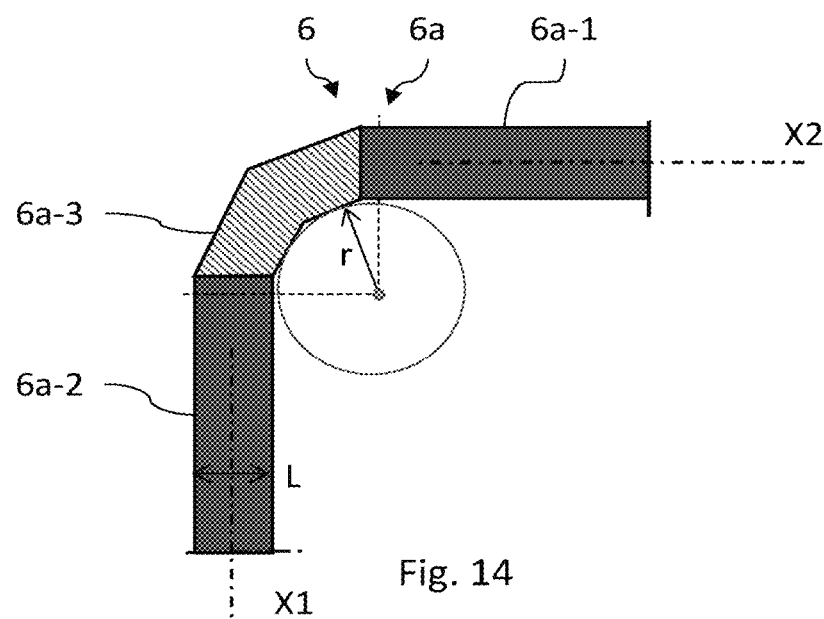

According to one embodiment, shown in FIGS. 7, 13 and 14, the encapsulating layer 6 is deposited on the perimeter of the matrix of detectors 2 so that the cross section of the layer has, in a plane parallel to the plane of the substrate, a shape with rounded corners.

Thus, the peripheral wall 6a of the encapsulating layer 6 is formed, at each corner, from two portions 6a-1, 6a-2 extending substantially rectilinearly, each along an axis X1, X2 that is orthogonal to the other. The rectilinear portions 6a-1 and 6a-2 do not join at a right angle but are connected to each other by a rounded portion 6a-3.

By rounded portion, what is meant is a portion having at least one curved and for example circular or elliptical segment, or at least one right segment, and preferably a plurality of right segments, extending along an axis that is not colinear with the respective axis of the rectilinear portions.

FIG. 13 shows an example of a rounded portion 6a-3 taking the form of a circular arc segment connecting the rectilinear portions 6a-1 and 6a-2. The radius of this circular arc, measured from the external surface of the rounded portion 6a-3, i.e. the surface oriented toward the exterior of the cavity (escribed circle), may be larger than or equal to two times the width L of the peripheral wall. Preferably, the dimensions of the rounded portion are such that the radius of an inscribed circle, i.e. a circle tangent to the internal surface oriented toward the cavity, of the rounded portion is larger than or equal to two times the width L.

The width L is defined as the average width of a substantially rectilinear portion 6a-1, 6a-2 of the peripheral wall 6a. The rounded portion 6a-3 preferably has a width substantially equal to that of the rectilinear portions.

FIG. 14 shows another example of a rounded portion, as a variant to that in FIG. 13. In this example, the rounded portion 6a-3 is formed by a succession of two right segments that are inclined one relative to the other. It is possible to define an escribed circle, tangent to the external surface of each segment. The orientation of the segments may be such that the radius of the escribed circle is larger than or equal to two times the width L of the peripheral wall. Preferably, the orientation of the segments is such that the radius of an inscribed circle, i.e. a circle tangent to the internal surface of the segments, is larger than or equal to two times the width L.

By way of example, the width L of the peripheral wall of the encapsulating layer may be comprised between about 200 nm and 2 µm. The radius of the inscribed or escribed circle is larger than or equal to a value comprised between 400 nm and 4 µm depending on the width L, for example 2 µm in the case of a width L equal to 800 nm.

The inventors have observed that the production of rounded portions at the corners of the capsule improves the adherence of the latter to the substrate. Specifically, it has been observed that the adherence of the capsule is not uniform along the peripheral wall and that the corners of the capsule have a reinforced adherence when rounded portions are produced.

Thus, when the capsule includes rounded corners and internal bearing portions, the overall adherence of the capsule to the substrate is reinforced, by virtue of a combined effect of the multiplicity of bearing areas and the local reinforcement of the adherence at the corners of the cavity.

Of course, the encapsulating structure with rounded corners described here in the case where one and the same cavity houses a matrix of detectors may be used in the case where a plurality of hermetic cavities are produced, each housing a single detector.

The invention claimed is:

1. A device for detecting electromagnetic radiation, comprising:
   a substrate;
   at least one thermal detector, placed on the substrate, including a membrane suitable for absorbing the radiation to be detected, which membrane is suspended above the substrate and thermally insulated therefrom by thermally insulating holding elements; and
   an encapsulating structure encapsulating said at least one thermal detector, including an encapsulating layer extending around and above said at least one thermal detector so as to define with the substrate a cavity wherein said at least one thermal detector is located,
   wherein the encapsulating layer comprises at least one through-orifice as an exhaust vent, said exhaust vent being placed so that at least one thermal detector has a single exhaust vent located facing a corresponding absorbing membrane, and
   wherein said absorbing membrane, facing said exhaust vent, includes a through-orifice located perpendicular to said exhaust vent and of a size equal to or larger than that of said exhaust vent.

2. The detecting device according to claim 1, wherein a plurality of thermal detectors is placed in said cavity, the encapsulating layer comprising a plurality of exhaust vents placed so that at least some of said thermal detectors each have a single exhaust vent located facing the corresponding absorbing membrane, or wherein a single thermal detector is placed in said cavity, the encapsulating layer then comprising a single exhaust vent located facing the absorbing membrane of the thermal detector.

3. The detecting device according to claim 1, wherein the absorbing membrane includes a stack of a bolometric layer, a dielectric layer that is structured so as to form two separate portions, and an electrically conductive layer that is structured so as to form three electrodes, two of said electrodes, which are intended to be raised to the same electrical potential, flanking the third electrode, which is what is referred to as the central electrode and which is intended to be raised to a different electrical potential, each electrode making contact with the bolometric layer, the central electrode being electrically insulated from the other electrodes by the dielectric layer, the orifice passing through the central electrode and the bolometric layer in a zone located between the portions of the dielectric layer.

4. The detecting device according to claim 1, wherein the encapsulating structure furthermore includes a sealing layer covering the encapsulating layer so as to make the cavity hermetic, and wherein the substrate comprises a fixing layer placed facing the through-orifice of the corresponding membrane and suitable for ensuring the adhesion of the material of the sealing layer.

5. The detecting device according to claim 4, wherein the fixing layer extends under the whole of the corresponding membrane and is made of a material suitable for furthermore reflecting the electromagnetic radiation to be detected.

6. The detecting device according to claim 1, wherein the exhaust vent has a transverse profile, in a plane orthogonal to the plane of the substrate, the width of which increases with distance from the substrate.

7. The detecting device according to claim 6, wherein the encapsulating structure furthermore includes a sealing layer covering the encapsulating layer so as to make the cavity hermetic, the sealing layer including a border that extends in the direction of the thickness of the sealing layer, from the border of the exhaust vent, with a non-zero angle $\alpha$ relative to an axis orthogonal to the plane of the substrate, and wherein the transverse profile of the exhaust vent makes an angle $\beta$ to the same orthogonal axis larger than the angle $\alpha$.

8. The detecting device according to claim 6, wherein the longitudinal end of the exhaust vent has a circularly arcuate shape, or is formed from a succession of substantially rectilinear segments that are inclined relative to one another.

9. The detecting device according to claim 1, including a matrix of thermal detectors, wherein the encapsulating layer comprises at least one portion, which is what is referred to as an internal bearing portion, located between two adjacent detectors, and which bears directly against the substrate.

10. The detecting device according to claim 9, wherein the internal bearing portion has a profile, in a plane parallel to the plane of the substrate, of oblong shape, preferably with rounded longitudinal ends.

11. The detecting device according to claim 9, wherein the internal bearing portion includes a sidewall and a bottom portion, said sidewall extending in a plane substantially orthogonal to the plane of the substrate over the entire height of the cavity, and the bottom portion making contact with the substrate.

12. The detecting device according to claim 9, wherein at least one internal bearing portion is placed between two adjacent absorbing membranes and two adjacent holding pins, each of said holding pins participating in the holding of said adjacent membranes, and wherein the internal bearing portion is oriented longitudinally alongside said membranes.

13. The detecting device according to claim 1, wherein the encapsulating layer comprises a peripheral wall that encircles the matrix of detectors, and that has a cross section, in a plane parallel to the plane of the substrate, of square or rectangular shape the corners of which are rounded.

14. The detecting device according to claim 9, the thermally insulating holding elements including holding pins, wherein the fixing layer furthermore includes portions on which the holding pins rest, and/or portions on which internal bearing portions of the encapsulating layer rest, and is made from a material able to ensure the adhesion of the holding pins and/or the bearing portions.

* * * * *